March 9, 1954
C. H. DICKE
2,671,881
TEMPERATURE REGULATING SYSTEM
Filed July 30, 1949
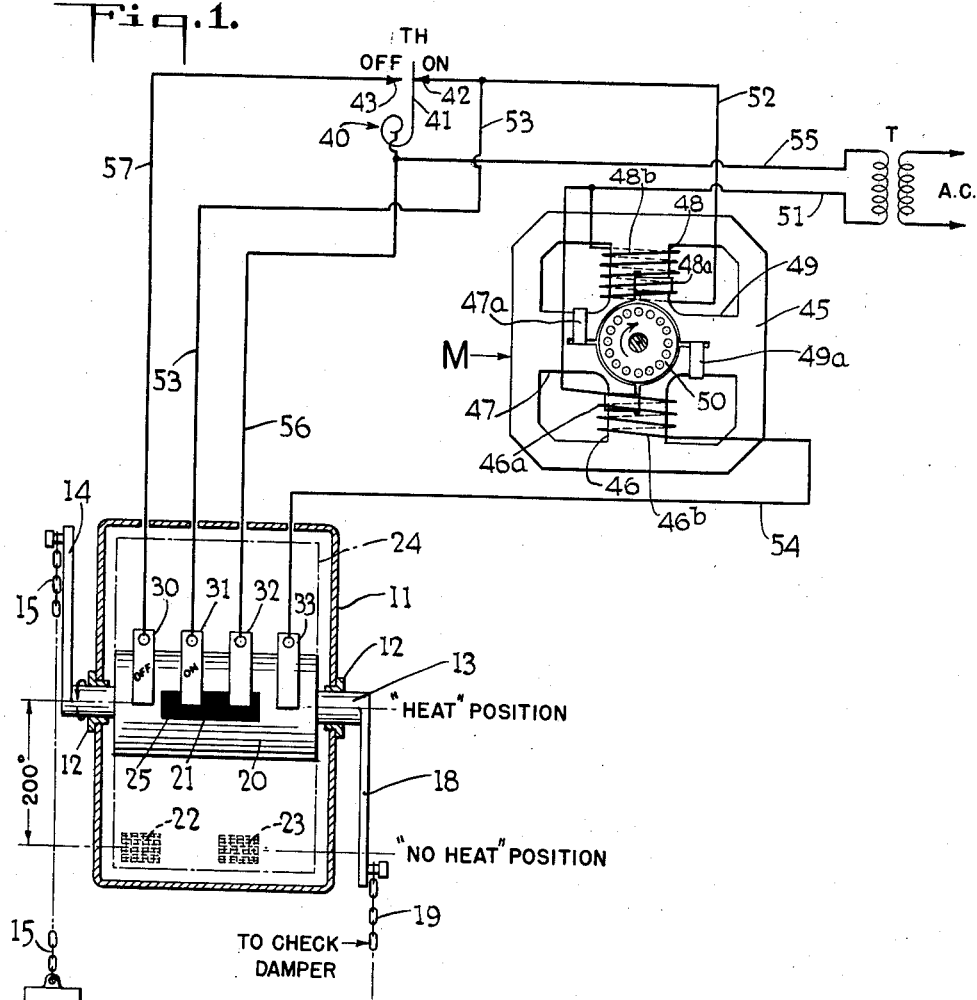
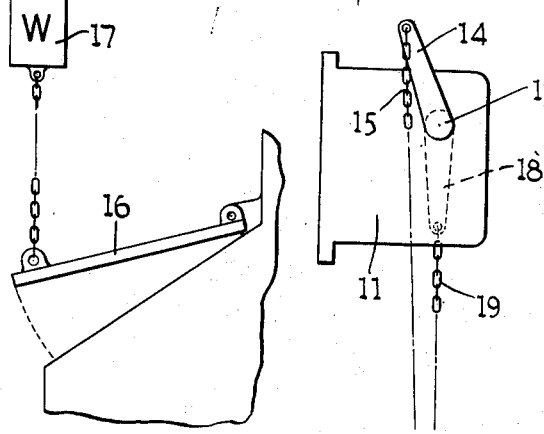
INVENTOR.
CARL H. DICKE
BY
Tom Walker
ATTORNEY Patented Mar. 9, 1954

2,671,881

UNITED STATES PATENT OFFICE 2,671,881

TEMPERATURE REGULATING SYSTEM

Carl H. Dicke, New Bremen, Ohio, assignor to Crown Controls Company, Inc., New Bremen, Ohio, a corporation of Ohio Application July 30, 1949, Serial No. 107,683

11 Claims. (Cl. 318—471)

This invention relates to an improved temperature regulating system and more particularly to such a device for use in connection with the regulation of dampers for heating furnaces.

An object of the invention is to provide a simple and reliable mechanism which will assure that upon the occurrence of electric power failures the damper or other heat supply controlling mechanism will be adjusted automatically to reduced heat condition.

A further object is to provide an energy storing device such as a weight or spring which will upon the occurrence of power failures and a consequent de-energization of the electric mechanism cause the damper controlling mechanism to return to normal "no heat" position.

Another object is to provide such a device in which the damper controlling motor will in normal operation move in a forward direction from "heat" to "no heat" position whereas upon the occurrence of power failures the motion from the "no heat" position will occur reversely.

Another object is to provide such a device including an electric motor having a plurality of operating coils, two being illustrated, arranged in parallel together with means for so controlling the supply of current thereto that both coils are energized during the operation from the "no heat" to the "heat" position and means for energizing only one of said coils when the parts have arrived at "no heat" position.

Another object is to provide such a device in which both coils are energized during the major portion of the operation from "no heat" to "heat" position when power is on.

Further objects and advantages of the invention will be apparent from consideration of the specification as illustrated by the accompanying drawings of an illustrative embodiment of the invention, in which drawings:

Fig. 1 represents more or less schematically one form the device may take, the parts being shown in the "heat" position; and Fig. 2 is a side elevation of the damper motor showing the position of the cranks in the "heat" position.

Referring to said drawings, TH represents generally a room thermostat located in the space the temperature of which is to be controlled and T represents the usual step-down transformer connected to the supply lines and delivering current at relatively low voltage to operate the mechanism.

The damper motor proper may consist of housing 11 containing suitable bearings 12 and the operating shaft 13, one end of which is carried a crank 14 shown connected through a chain or the line 15 to the draft damper 16 of the furnace to be controlled.

17 represents an energy storing device such as a weight or spring so connected as to aid the closing of the draft damper. The crank 14 is preferably so located on the shaft 13 that it stands about 10° from the vertical when the motor is in the "heat" position (see Fig. 2). The purpose of this is to make sure that the energy storing device is capable of applying torque to the shaft 13 in the "heat" position.

When a check damper is also to be operated, it may be desirable to provide also a crank 18 to which is connected a chain or the line 19 connected to the check damper. The shaft 13 may be operated by the motor M through suitable reduction gearing (not shown), the gearing being such as to rotate the shaft 13 in the direction indicated by the arrow in Fig. 1.

Suitable circuit commutating means are provided which may take the form of a commutator such as the one shown, for example, in my application for United States Patent S. N. 654,052, filed March 13, 1946, now Patent No. 2,548,424, dated April 10, 1951. Thus the shaft 13 may be provided with a commutator sleeve 20 having suitable openings therein such as 21, 22, 23. The dotted rectangle represents a development of the exterior surface of such a commutator sleeve. The sleeve 20 is mounted upon an insulating tube 25 carried by the shaft 13 so that the tube and sleeve will rotate with said shaft. Mounted within the motor housing is an "off" brush 30 and "on" brush 31 and "operation completing" brush 32 and a "ground" brush 33 which is always in contact with the commutator sleeve 20. It will be noted that in the "heat" position shown, the "off" brush is also in contact with the sleeve 20. When the shaft 13 is in the "no heat" position, the openings 22 and 23 will have moved to the brush contact line so that in said position the "on" brush 31 is in contact with the commutator sleeve.

The thermostat may, as usual, be comprised of a thermo responsive element 40 having a contact blade 41 which may, at times, engage "on" contact 42, and, at other times, "off" contact 43.

The motor in the form shown consists of a stator 45 having four pole pieces 46, 47, 48, and 49, each extending toward the rotor 50 which may be of the well-known squirrel cage type. The pole pieces 46–49 inclusive, are shown provided with shading coils 46a, 47a, 48a, and 49a respectively. As shown, pole piece 46 is surrounded by coil 46b and pole 48 is surrounded by coil 48b. The coil 48b consists of finer wire or more turns or both than coil 46b so that it will draw less current than coil 46b. One end of each of these coils is connected through conductor 51 to one side of the secondary of transformer T. The side of coil 48b is connected through conductor 52 with the "on" contact 42 of the thermostat and through conductor 53 with "on" brush 31. The other end of coil 46b is connected through conductor 54 to the "ground" brush 33. The other side of the transformer secondary is connected through conductor 55 with the thermostat contact blade 41 and through conductor 56 with the "operation completing" brush 32. The "off" contact 43 of the thermostat is connected through conductor 57 with the "off" brush 30.

It will be noted that in the "heat" position shown only coil 48b is energized. The circuit is from the transformer through conductor 51, coil 48b, conductor 52, "on" contact 42, blade 41 and conductor 55 back to the transformer. The energization of coil 48a applies a forward torque to rotor 50 which applies a clockwise torque to crank 14 as viewed in Fig. 2. This torque is sufficient to prevent reverse rotation of crank 14 due to pull of weight 17 or a spring (if used) but is not sufficient to cause forward rotation. If, however, a power failure should occur at this time (while the parts are in the "heat" position) the motor would be de-energized and crank 14 would rotate counter-clockwise under the action of the energy storing means until the crank 14 points substantially downwardly thus leaving the draft damper closed and the check damper open. This is, of course, desirable to prevent overheating of the heating plant during periods of power failure.

If, with the parts in the position shown, the thermostat should become satisfied so that the blade 41 moves from its "on" contact 42 to its "off" contact 43 (preferably by snap action), coil 48b will, at first be de-energized and 46b will be energized. The circuit through coil 46b will be via conductor 51, coil 46b, conductor 54, brush 33, commutator tube 20, brush 30, conductor 57, "off" contact 43, blade 41, bi-metal 40 and conductor 55 back to the transformer. As coil 46b draws more current there will be sufficient forward motor torque to rotate crank 14 clockwise. After a slight forward rotation of crank 14 and commutator tube 20, brush 31 will engage the commutator. This will serve to energize also the coil 48b to assist coil 46b. The circuit through coil 48b is via conductor 51, coil 48b, conductors 52, 53, brush 31, commutator 20, brush 30, conductor 57, "off" contact 43, blade 41, bi-metal 40 and conductor 55 back to the transformer. This operation will continue until the crank 14 and commutator 20 have moved a little more than one-half revolution, at which time brush 30 will engage insulating material 22 and brush 32 will engage insulating material 23, thus breaking the circuit from the transformer to both coils 48b and 46b.

The parts are now in the "no-heat" position. If, now the temperature drops so that thermostat blade 41 moves over to "on" contact 42, coil 46b will be energized, the circuit being as follows: conductor 51, coil 46b, conductor 54, brush 33, commutator 20, brush 31, conductor 53, contact 42, blade 41, bi-metal 40, and conductor 55 back to the transformer. Since coil 46b is sufficiently powerful to alone start the motor, the crank 14 will start to move clockwise from its downwardly directed position. This will cause insulating portions 22 and 23 to move away from under brushes 30 and 32 so that they will engage the commutator 20. This will also cause coil 48b to be energized, the circuit being as follows: conductor 51, coil 48b, conductors 52, 53, brush 31, commutator 20, brush 32, conductors 56 and 55 back to the transformer. This action will continue for about 160° until the parts arrive at the position shown in the drawings at which time coil 46b will become de-energized and the motor will stop. However, coil 48b will remain energized through the circuit described above and supply sufficient forward torque to prevent reverse motion of the crank 14, the gearing and the rotor 50 under the bias exerted by the weight 17 or a spring, if used. The parts will, therefore, remain in the "on" position shown until a power failure occurs (in which case the crank 14 will rotate counter-clockwise under the action of the energy storing means) or until the thermostat is satisfied and the blade 41 engages "off" contact 43 in which case the rotor and crank 14 will rotate forwardly as described above.

The reason for having only one winding (48b) effective while the heat supply control motor is in the "heat" position and making that winding weaker than the other winding (46b) is that the control motor will frequently stand in the "heat" position for long periods. As the electric motor is stalled during these periods its efficiency is zero and all the electric power delivered to it is converted into heat. The input wattage must therefore be kept as low as possible to prevent overheating the winding 48b and the bearings. During these periods the electric motor acts as a "torque motor" as it may be stalled for long periods.

To simplify the disclosure, the energy storing, motor biasing means has been shown as the weight W but it is to be understood that a return spring may be preferred. In fact, the present invention is used in practice with the construction shown and described in the application of Wilbert A. Will, Serial Number 94,314, filed May 20, 1949, now Patent No. 2,613,543, dated October 14, 1952.

It is to be noted that the construction shown and described will serve admirably to accomplish the objects stated above. It is to be understood, however, that the construction disclosed above is intended merely as illustrative of the invention and not as limiting as various modifications therein may be made without departing from the invention as defined by a proper interpretation of the claims which follows.

I claim:

1. An electric motor for use in a heat supply control means for use in a temperature regulating system, the said electric motor having at least two windings of different characteristics so that one draws sufficient current to cause the motor to be rotated forwardly against a substantial load, whereas the other winding draws only sufficient current to cause the electric motor to have the characteristics of a "torque motor," and circuit control means so arranged as to energize either, neither or both of said windings.

2. In a temperature regulating system of the type including an electrically operable heat supply control means adapted to control the supply of heat to a space, a thermostat to be located in said space, and an electric power source, the said heat supply control means including an electric motor having at least two windings of different characteristics so that one draws sufficient current to cause the motor to be rotated forwardly whereas the other winding draws sufficient current to develop only a small forward torque, circuit means from said power source and connected to said thermostat and said electric motor, and commutator means forming part of said heat supply control means so arranged that when the thermostat moves to the "on" position, the stronger of said windings is energized to rotate the motor to the "heat" position but when the heat supply control means has been moved to the "heat" position, said stronger winding will be de-energized and the weaker winding will be energized.

3. In a temperature regulating system of the type including an electrically operable heat supply control means adapted to control the supply of heat to a space, a single-pole, double-throw thermostat to be located in said space, said heat supply control means being of the type which has energy storing means connected to bias said means reversely from its "heat" to its "no heat" position, and an electric power source, the said heat supply control means including an electric motor having at least two windings of different characteristics so that one draws sufficient current to cause the motor to be rotated forwardly, whereas the other winding draws sufficient current to develop a forward torque which is not sufficient to rotate the motor forwardly, circuit means from a power source connected to said thermostat and said electric motor, and commutator means forming part of said heat supply controlling means so arranged that when the thermostat moves to the "on" position, the stronger of said windings is energized but when the heat supply control means has been moved to the "heat" position, said stronger winding will be de-energized and the weaker winding will be energized.

4. In a temperature regulating system of the type including an electrically operable heat supply control means adapted to control the supply of heat to a space, a thermostat to be located in said space, and an electric power source, the said heat supply control means including an electric motor having at least two windings of different characteristics so that one draws sufficient current to cause the motor to be rotated forwardly against a substantial load whereas the other winding draws only sufficient current to cause the electric motor to have the characteristics of a "torque motor," circuit means including said power source, thermostat and electric motor, and commutator means forming part of said heat supply controlling means so arranged that when the thermostat moves to the "on" position, the stronger of said windings is energized but when the heat supply control means has been moved to the "heat" position, said stronger winding will be de-energized and the weaker winding will be energized so that the electric motor will function as a "torque motor."

5. A control apparatus of the class described, comprising in combination, a rotary operator, means for biasing said operator toward a pre-determined position, rotary electric motor means coupled to said opeator for moving said operator away from the position to which it is biased against its biasing means, said motor being provided with a low-wattage and a high-wattage energizing coil, means to first energize the high-wattage coil and then both coils whereby the motor is rendered operative to move said operator away from its biased position and means to then de-energize said high-wattage coil to maintain said operator in such new position while the motor is stalled.

6. A control apparatus of the class described, comprising in combination, a rotary operator, means for biasing said operator toward a predetermined position, rotary electric motor means coupled to said operator for moving said operator away from the psition to which it is biased against its biasing means, said motor being provided with a low-wattage and a high-wattage energizing coil, means to first energize the high-wattage coil and than both coils whereby the motor is rendered operative to move said operator away from its biased position, means to then de-energize said high-wattage coil to maintain said operator in such new position while the motor is stalled and means for then first energizing the high-wattage coil and then both coils whereby the motor is rendered operative to move said operator forwardly to the position to which it is biased.

7. A control apparatus of the class described, comprising in combination, a rotary operator, means for biasing said operator toward a predetermined position comprising a crank and an energy storing device connected to said crank, rotary electric motor means coupled to said operator for moving said crank away from the position to which it is biased against the bias exerted by said energy storing device, said motor being provided with a low-wattage and a high-wattage energizing coil, means to first energize the high-wattage coil and then both coils whereby the motor is rendered operative to move said crank away from its biased position and means to then de-energize said high-wattage coil to maintain said crank in such new position while the motor is stalled.

8. A control apparatus of the class described, comprising in combination, a rotary operator, means for biasing said operator toward a predetermined position comprising a crank and an energy storing device connected to said crank, rotary electric motor means coupled to said operator for moving said crank away from the position to which is biased against the bias exerted by said energy storing device, said motor being provided with a low-wattage and a high-wattage energizing coil, means to first energize the high-wattage coil and then both coils whereby the motor is rendered operative to move said crank away from its biased position, means to then de-energize said high-wattage coil to maintain said crank in such new position while the motor is stalled and means for then first energizing the high-wattage coil and then both coils whereby the motor is rendered operative to move said crank forwardly to the position to which it is biased.

9. A control apparatus of the class described, including an operating member, means for biasing said operating member in one direction, a rotary electric motor for moving said operating member in the opposite direction, said motor having two different coils one weaker than the other, an electrical control circuit for said motor including a switch adjustable to close a circuit through the relatively stronger one of said coils, and commutator means operated by operation of said motor acting in response to an initial rotation of said motor to close a circuit through the weaker one of said coils and in response to a predetermined further rotation of said motor to open the circuit through the stronger one of said coils.

10. A control apparatus according to claim 9, characterized in that said switch has alternating positions of adjustment in moving to each of which said switch opens the circuit through the weaker one of said coils and closes the circuit through the stronger one of said coils.

11. A control apparatus according to claim 10, characterized in that said commutator means has successive positions of adjustment to which it is moved by said motor in the alternate positions of said switch, said means tending in one of said positions to maintain the circuit open through the stronger one of said coils and to maintain the circuit closed through the weaker one of said circuits, and tending in the other one of said positions to maintain the circuit open through both said coils.

CARL H. DICKE.

References Cited in the file of this patent

UNITED STATES PATENTS

| Number | Name | Date |
|---|---|---|
| 1,696,617 | Welch | Dec. 25, 1928 |
| 2,032,658 | Gille | Mar. 3, 1936 |
| 2,230,612 | Crise et al. | Feb. 4, 1941 |
| 2,245,229 | Shaw | June 10, 1941 |
| 2,425,998 | Crise | Aug. 19, 1947 |
| 2,496,409 | Ratazak | Feb. 7, 1950 |
| 2,502,830 | Crise | Apr. 4, 1950 |